Sept. 1, 1959     H. B. CANNON     2,902,154
STRUCTURE FOR A SEPARATING APPARATUS
Filed June 14, 1957     4 Sheets-Sheet 1
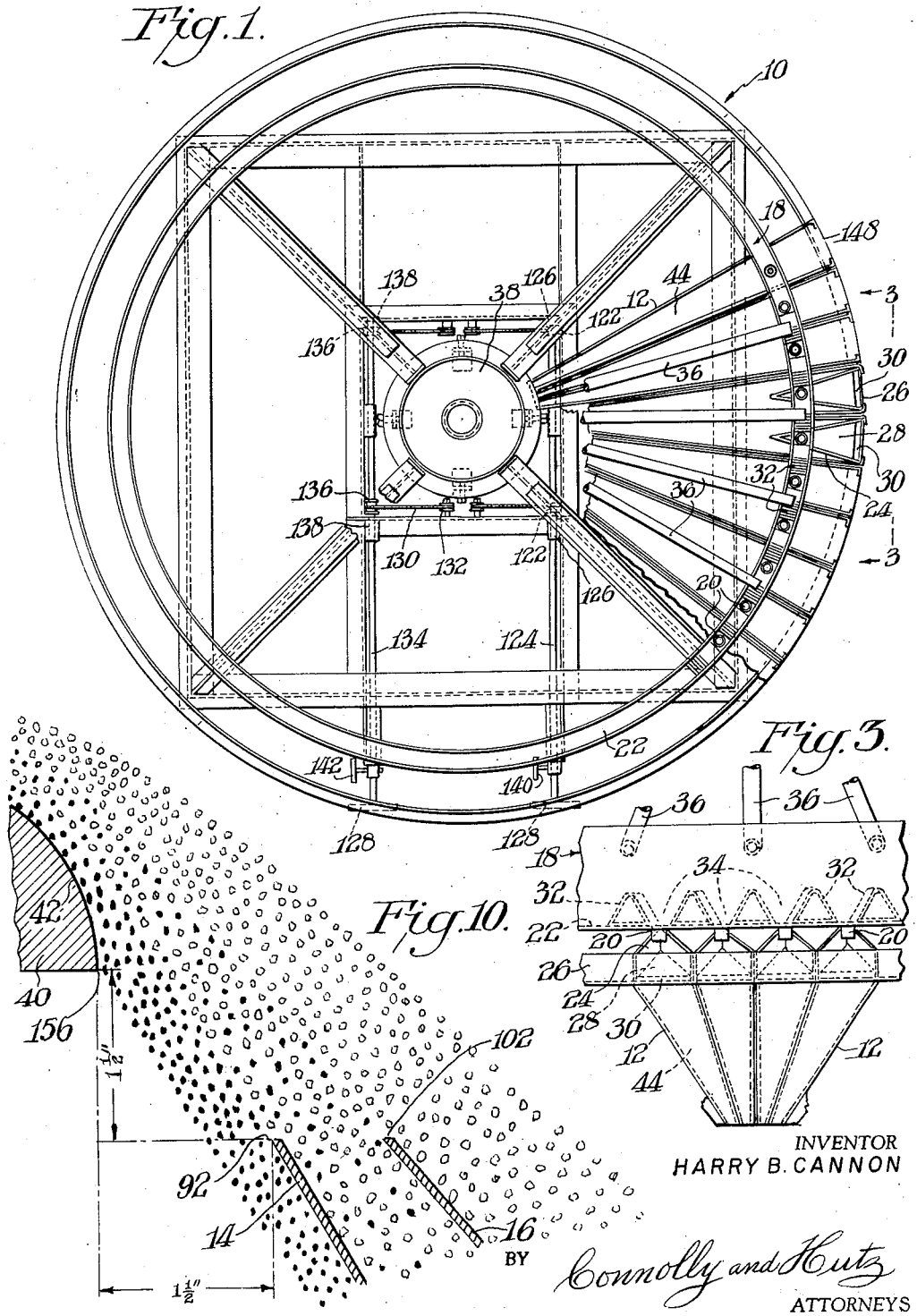
INVENTOR
HARRY B. CANNON
BY Connolly and Hutz
ATTORNEYS

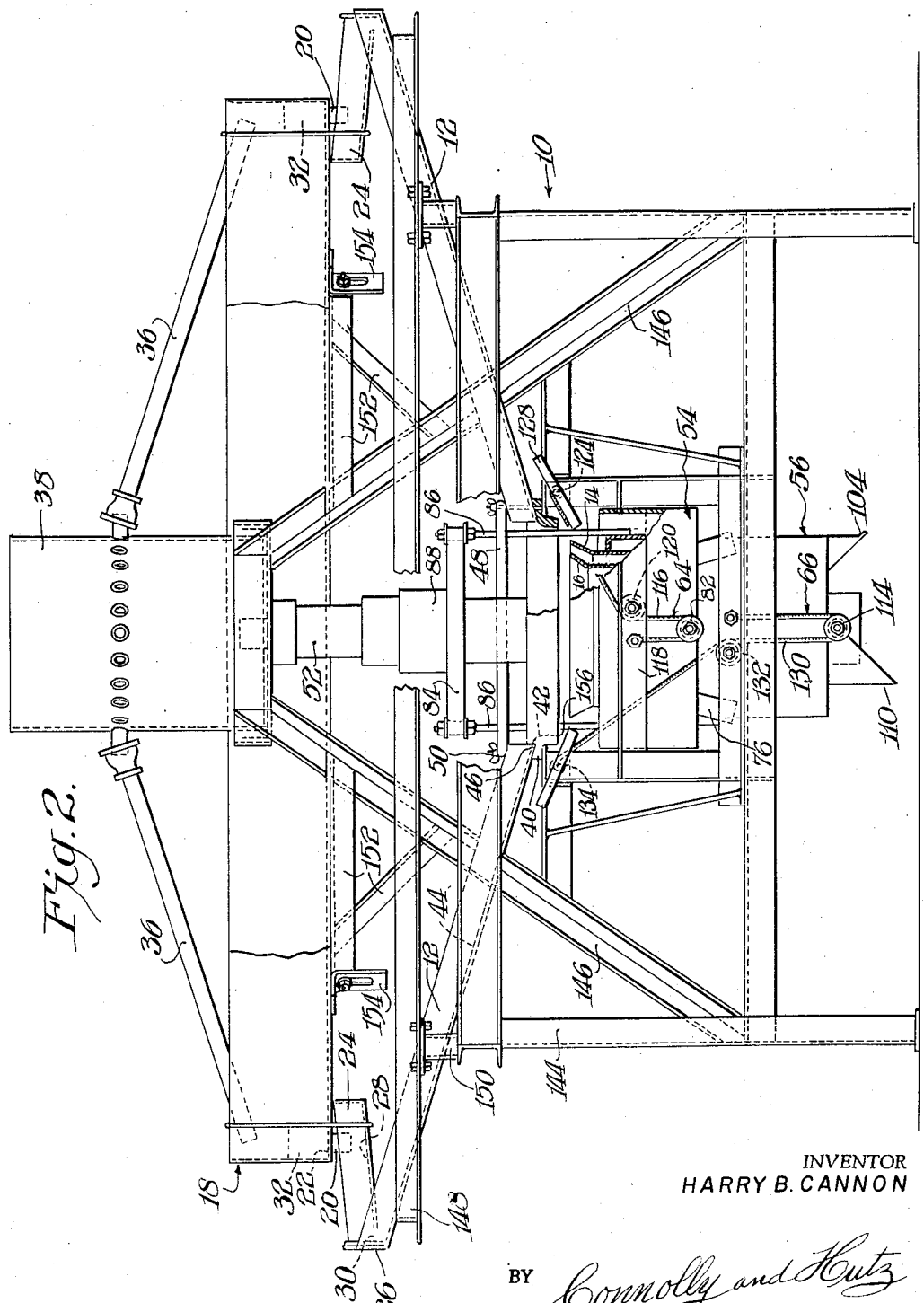

Sept. 1, 1959  H. B. CANNON  2,902,154
STRUCTURE FOR A SEPARATING APPARATUS
Filed June 14, 1957  4 Sheets-Sheet 3
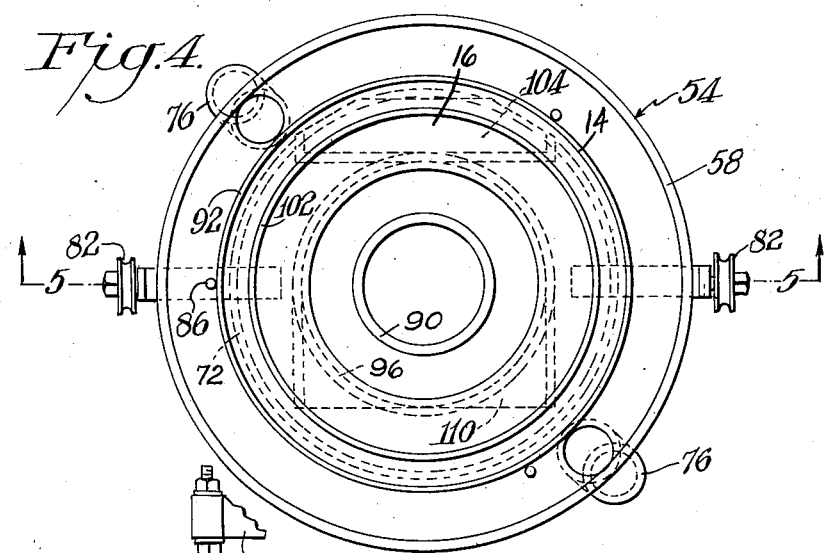
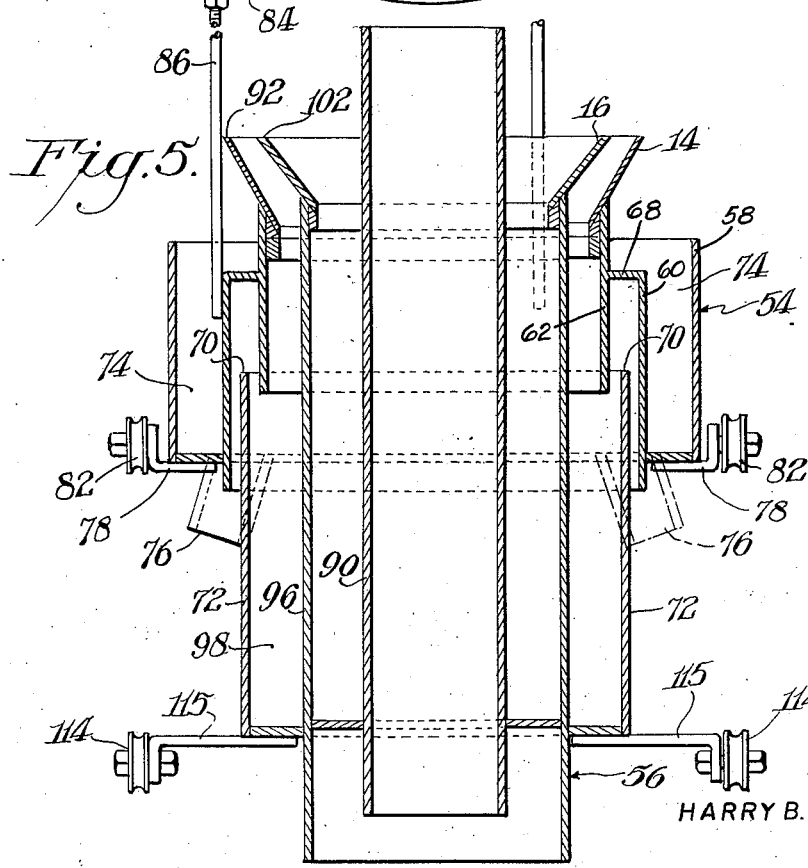
INVENTOR
HARRY B. CANNON
BY Connolly and Hutz
ATTORNEYS

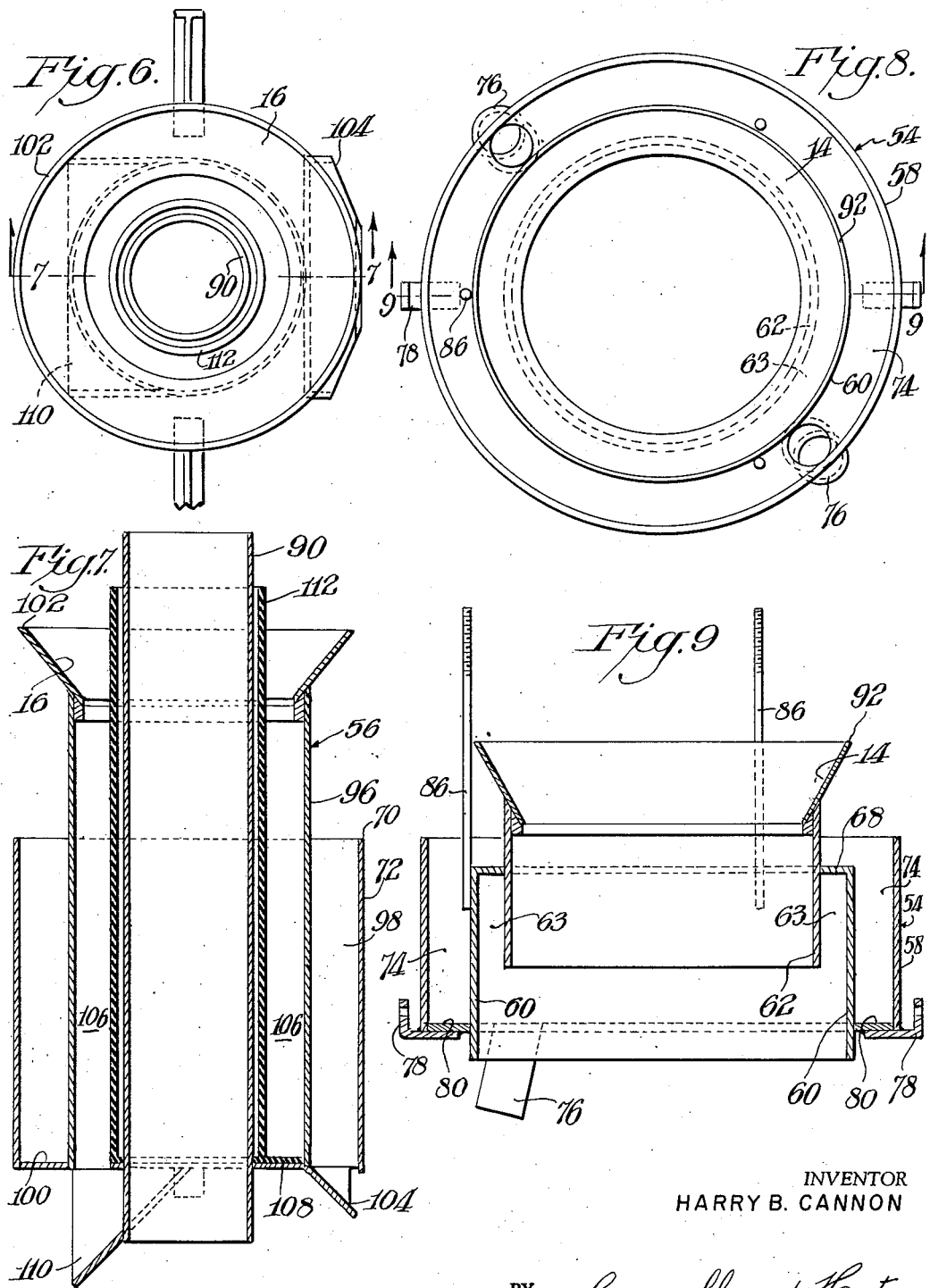

United States Patent Office 2,902,154
Patented Sept. 1, 1959

2,902,154

STRUCTURE FOR A SEPARATING APPARATUS

Harry B. Cannon, Lakeland, Fla.

Application June 14, 1957, Serial No. 665,861

12 Claims. (Cl. 209—444)

This invention relates to a structure for an apparatus for separating a slurry including granular mixtures into its constituent components, and more particularly relates to a structure for a gravity flow apparatus of the aforementioned type which includes a spoke-like arrangement of convergent troughs or sluices.

A novel method and apparatus for separating a slurry containing a granular mixture into its constituent components is disclosed and claimed in U.S. Letters Patent 2,766,882. This apparatus may include a spoke-like array of convergent troughs which slope downward and radially inward to a common outlet circle. In this method, a liquid slurry containing a dispersion of this granular mixture is guided to flow in a downwardly sloping and converging stream of increasing depth under tranquil laminar conditions of open channel type flow without sandbarring while substantially increasing its velocity to segregate the constituents making up the granular mixture into separate strata within the downwardly flowing stream. This stratified slurry is discharged in a freely falling stream which is divided into separated streams in accordance with its stratification by a sharp-edged flow dividing means disposed within the stream. Suitable apparatus for practicing this method includes, for example, troughs which have raised side walls converging at angles between 6 and 16 degrees to an outlet width of between ⅜ inch and one inch. These troughs have a flat bottom which may be inclined to the horizontal at angles between 9 and 23 degrees.

Subsequently issued U.S. Letters Patent 2,769,545 discloses and claims an improved structure for an apparatus of this type, particularly relating to construction and adjustment of the sharp-edged flow dividing elements. However, even though the structure described and claimed therein affords several marked advantages over structures previously known, it still leaves room for further improvement, particularly in the elimination of turbulence which interferes with most efficient separating operation of an apparatus of this type. It is also desirable to provide a more simple and economical structure of this type which may be adjusted, operated and maintained with ease.

An object of this invention is to provide an improved structure for an apparatus for separating a slurry containing a granular mixture into its constituent components which substantially prevents turbulence, promotes laminar flow without sandbarring, and provides increased efficiency in the dividing of the effluent stream into its constituent components.

Another object is to provide an improved structure of the type described which is simple and economical to manufacture and which is simple to operate, adjust and maintain.

In accordance with this invention, a circular channel means is disposed a predetermined distance above and within the inlet ends of a spoke-like arrangement of convergent troughs. An outlet means for supplying slurry to each of these troughs is incorporated in the base of this channel substantially in line with the centers of each of the troughs, and divergent segments slope downwardly and outwardly from each of these outlets to connect them with the inlets of the troughs below. These segments diverge to a width substantially equal to the width of the inlets to the troughs at a common rear wall shared therewith. The floors of these segments terminate a short distance from these common rear ends, which distance is sufficient to provide a space which permits the slurry to undergo a smooth transition from a radially outward direction of flow in the diverging segments to a radially inward direction of flow in the troughs.

Dividers or baffles are spaced about and within the circular channel to provide a separate pocket for feeding each of the outlets. The walls of these dividers slope or converge towards the outlets to prevent sandbarring within each of these pockets. A distributing tube conducts slurry from a centrally disposed tank to a point directly above every other one of these dividers or baffles to simultaneously supply a pair of channel pockets. These dividers are advantageously made substantially equal in height to the head of slurry in the channel which provides optimum flow conditions in succeeding portions of the apparatus. This maintains the supply of slurry provided to each of the outlets substantially segregated until the slurry level rises above the tops of the dividers and upon further rising, distributes it smoothly without surge to successive adjacent pockets.

The outlet ends of the concentrating troughs are supported upon a relatively smaller diameter ring concentrically disposed a predetermined distance below the circularly arranged inlet ends. The upper internal surface of this ring is curved downwardly and forms a smooth continuation of the trough floors. A notch is provided in this curved surface for receiving the outlet ends of the troughs to permit this downwardly curved inner surface of the ring to form a smooth continuation of the trough floors. The downward curve and continuous nature of this ring in a lateral direction helps promote a smooth fan-like discharge of the effluent stratified slurry under conditions which facilitates its splitting by a circular sharp-edged concentrate splitter element disposed a short distance below the inside of the outlets from the troughs.

The sharp edge of this circular splitter element is disposed at a point where the influence of the free fall and the downward curve of the ring have caused the stream of effluent slurry to fall with a substantially increased vertical component. This permits a splitter blade formed of a section of an inverted cone to be aligned throughout substantially all of its length parallel to the direction of flow of the effluent slurry. This substantially vertical disposition of the slurry flow also makes an adjustment in height of the splitter element result in a finer change in the proportional division of stratified constituent components in the effluent stream. The disposition of the splitter blade substantially parallel to the direction of effluent slurry flow also substantially reduces tumbling ahead of, or turbulence during its splitting action.

The circular splitter element is supported by pulley and cable means which facilitates a fine and continuous adjustment of its vertical position, as well as facilitating its removal and replacement. This pulley and cable suspension is also similarly advantageous for supporting a nested similarly formed and disposed second splitter element for dividing tailings and middlings from the effluent stream.

Novel features and advantages of the present invention will become apparent to one skilled in the art from a reading of the following description in conjunction with the accompanying drawings wherein similar reference characters refer to similar parts and in which:

Fig. 1 is a top plan view of an embodiment of this invention;

Fig. 2 is a view in elevation partially broken away in cross section of the embodiment shown in Fig. 1;

Fig. 3 is a cross-sectional view taken through Fig. 1 along the line 3—3 and looking in the direction of the arrows;

Fig. 4 is a plan view of a portion of the embodiment shown in Figs. 1 and 2;

Fig. 5 is a cross-sectional view taken through Fig. 4 along the line 5—5 and looking in the direction of the arrows;

Fig. 6 is a top plan view of a component portion of the portion shown in Figs. 4 and 5;

Fig. 7 is a cross-sectional view taken through Fig. 6 along the line 7—7 and looking in the direction of the arrows;

Fig. 8 is a top plan view of another component of the portion shown in Figs. 4 and 5;

Fig. 9 is a cross-sectional view in elevation taken through Fig. 8 along the line 9—9 and looking in the direction of the arrows; and Fig. 10 is a diagrammatic view in cross section of a portion of the embodiment shown in Fig. 2 in conjunction with characteristic slurry stream flow.

In Figs. 1 and 2 a separating apparatus 10 is shown which incorporates a spoke-like array of convergent troughs or sluices 12, for example, forty-eight in all. Apparatus 10 also includes a nested pair of circular splitter elements or blades 14 and 16 disposed at the outlets from troughs 12 for dividing or splitting the stratified slurry which issues from these outlets into its constituent components in accordance with the stratification induced in these troughs. This mode of separation is described in detail in aforementioned U.S. Letters Patent 2,766,882 and 2,769,545 to which reference may be made for details thereof.

Referring once more to Figs. 1 and 2, a circular channel means 18 is disposed a predetermined distance above and within the inlet ends of the spoke-like arrangement of convergent troughs 12. An outlet for each trough, for example, forty-eight nozzles 20 are incorporated in the base or floor 22 of channel 18. These nozzles 20 are each positioned substantially in line with the longitudinal centers of respective troughs 12. Replaceable sets of outlets of varying size are provided to influence optimum flow for different kinds of slurries.

A divergent trough-like segment 24 slopes downwardly and outwardly from each of nozzles 20 to connect them with the inlets to troughs 12 below. Segments 24 diverge from an initial width, for example just large enough to accept the full flow from nozzle 20 to a final width which is substantially equal to the width of trough 12 at its inlet. Segments 24 merge with the inlets to troughs 12 at a common rear wall 26. The base or floor 28 of each segment 24 terminates a short distance from common rear wall 26. This distance is sufficient to provide a space 30 which permits the slurry to undergo a smooth transition or reversal from a radially outward flow in segment 24 to a radially inward flow in trough 12.

The dimensions and slope of trough 12 are, for example, in accordance with the values disclosed and claimed in Patent 2,766,882, and the slope of segments 24 may be substantially equal to the slope of the troughs to similarly provide a smooth laminar flow of slurry without sandbarring. Any slope, however, may be utilized for segments 24 which feeds a smooth continuous supply of slurry to the trough under atmospheric pressure conditions.

Referring to Fig. 1, dividers or baffles 32 are spaced uniformly about and within channel 18 to provide separate pockets 34 for feeding each of nozzles 20. The walls of these dividers taken in cross section along the circumference of the channel, as shown in Fig. 3 are for example, triangular or parabolic in cross section to promote a smooth flow into outlets 20 without sandbarring.

A spoke-like array of distributing tubes or pipes 36, for example twenty-four in all, conduct slurry from a centrally disposed supply tank 38 to points substantially directly above every other divider or baffle 32. Each distributing tube 36, therefore, simultaneously supplies a pair of pockets 34.

Dividers or baffles 32 are, for example, made substantially equal in height to the head of slurry in channel 18 which provides optimum flow conditions in succeeding portions of the apparatus. An advantageous height, for example, is provided at the rounded peak of an equilateral triangle 2½ inches long on each side.

The outlet ends of troughs 12 are supported upon a relatively smaller diameter ring 40 formed as a metal casting or molded plastic or rubber, for example, which is disposed a predetermined distance below the circularly arranged inlet ends of troughs 12. The upper and inner surface 42 of ring 40 is curved downwardly to form a smooth continuation of floors 44 of troughs 12 which rest within continuous offset 46 formed in its upper surface. An offset 46 is formed in the upper surface 42 of the ring 40 for the outlet ends of troughs 12 to permit the downwardly curved inner surface 42 to form a smooth continuation of the floor 44 of each trough 12. The continuous curve in a lateral direction of surface 42 from outlet to outlet helps promote smooth discharge of the effluent slurry under conditions which facilitate its splitting in accordance with the stratification induced in the trough. This is assisted by the continuity of the ring which effects a restraint by surface tension on the effluent slurry discharged from each of the troughs while maintaining a guiding effect upon the slurry which permits a smooth and directed discharge of the effluent slurry.

The outlet ends of troughs 12 are maintained firmly engaged in offset 46 by a hold-down ring 48 secured to discharge ring 40 by bolt and wing nut assemlies 50, for example. Further advantageous guiding characteristics of ring surface 42 will be later discussed in conjunction with splitter elements 14 and 16.

A supply of slurry is conducted upward to tank 38 by means of a vertical central tube or pipe 52 which passes upwardly through the center of nested splitter elements 14 and 16. Pipe 52 also helps centrally position elements 14 and 16 relative to discharge ring 42. Supply pipe 52, for example, is a standard three-inch i.p.s. pipe. Pipe 52 can be used only as guide. When it is so used, the feed to tank 38 is introduced vertically from above, for example. In such case pipe 52 is plugged off at base of tank 38.

Splitter elements or blades 14 and 16 are supported upon corresponding bucket assemblies 54 and 56 which are shown in detail in Figs. 4–9. Bucket assemblies 54 and 56 are similar in many respects to the nested buckets shown in detail in U.S. Letters Patent 2,769,545. However, there are significant differences in the shape and spacial disposition of circular splitter blades 14 and 16 and in the cable suspensions 64 and 66 respectively associated with buckets 54 and 56. As far as these cable suspensions are concerned, this application is a continuation in part of copending application Serial No. 612,499, filed September 27, 1956, by this same inventor. Details of nested buckets 54 and 56 and respective pulley and cable suspensions 64 and 66 are shown in Fig. 2 taken in conjunction with Figs. 4–9 which are fully discussed in the following.

Structural details of nested bucket elements 54 and 56 are shown in Figs. 4 and 5 which illustrate these elements in the nested relationship which they assume when mounted upon apparatus 10 in the manner shown in Fig. 2.

Outer splitter bucket assembly 54, shown in sole relationship in Figs. 8 and 9, includes three concentric cylindrical shells 58, 60 and 62 taken in order from outermost to innermost. An annular plate 68 joins the top of intermediate shell 60 with the side of inner shell 62 to seal off the top of the annular space 63 therebetween for insertion of the upward extending edge 70 of the outermost shell 72 of inner splitter bucket assembly 56 as shown in Fig. 4.

The annular space 74 between outermost shell 58 and intermediate shell 60 provides a means for collecting concentrate and is drained by discharge tubes 76, for example, two in number, disposed at 180° with respect to each other.

A pair of suspension lugs or brackets 78 are secured by welding for example, beneath the base of annular plate 80 which forms the floor of concentrate collecting chamber 74. A pair of pulley assemblies 82 (Fig. 4) are rotatably mounted upon brackets 78 to provide means for suspending and adjusting the height of outer bucket assembly 54.

A spider bar 84 is mounted upon suspension bars 86 which extend upwardly from intermediate shell 60 of assembly 54. Upon spider bars 84 is centrally mounted a collar 88 which rides up and down upon and relative to inner splitter bucket assembly 56. Collar 88 is, for example, made of five inch i.p.s. piping or tubing, and innermost shell of inner splitter bucket 56 is, for example, a section of four inch i.p.s. piping or tubing. These elements, therefore, may be longitudinally telescoped and adjusted relative to each other and with respect to the three inch i.p.s. central supply tube which feeds tank 38.

Conical splitter blade 14 is secured to the top of innermost shell 62 of outer splitter bucket assembly 54. Blade 14, accordingly, is designated the outer splitter blade. It is described as conical because it is formed as a section of an inverted cone. The wall of splitter blade 14 extends towards the outlets from trough 12. It is disposed, for example, at an angle of 60° to the horizontal to provide efficient division of the effluent stream of slurry in accordance with stratification induced in the troughs. Its optimum position and dividing characteristics are later described in detail.

In Figs. 6 and 7 are shown details of inner splitter bucket assembly 56 which also includes three concentric shells. These shells from outermost to innermost are outer shell 72, intermediate shell 96, and inner shell 90. The bottom of annular space 98 between outer shell 72 and intermediate shell 96 is sealed by annular plate 100 to permit middlings segregated between outer splitter blade 14 and inner splitter blade 16 to collect therein. A discharge chute 104 is mounted upon the bottom of ring 100 for facilitating discharge of middlings collected in chamber 98.

The bottom of annular space 106 between inner shell 90 and intermediate shell 96 is sealed by annular plate 108 which forms a chamber for collecting tailings which pass over inner splitter blade 16 into chamber 106. These tailings are discharged into a chute or pipe 110 mounted upon the bottom of ring 108. A boot 112, made of rubber for example, covers the exposed surfaces of inner shell 90 and ring-shaped plate 108 to prevent the tailings collected within chamber 106 from abrading these members.

Inner splitter blade 16 is formed of a conical section in a manner similar to outer splitter blade 14 but it is less vertically inclined than blade 14 for most efficient action. It is inclined, for example, at 50° to the horizontal.

Pulley assemblies 114 are mounted upon brackets 115 upon annular base plate 100 of bucket assembly 56 to provide means for supporting and adjusting the vertical position of bucket assembly 56 and particularly splitter blade 16.

In Figs. 1 and 2 are shown details of pulley and cable assemblies 64 and 66 respectively supporting outer splitter bucket 54 and inner splitter bucket assembly 56. Pulley and cable assembly 64 includes a cable 116 which is secured to a fixed portion of a rectangular frame 118 which surrounds nested bucket elements 54 and 56. Cable 116 passes under pulley assemblies 82 to support bucket assembly 54 and then passes through and over an idler pulley 120 also mounted upon frame member 118. Cable 116 then passes diagonally to a take-up reel 122 which is mounted upon an adjusting shaft 124 which is rotatably mounted within bearings 126 supported in frame 118. A handle 128 is secured to an extension of shaft 124 which permits shaft 124 to be rotated to adjust the vertical position of bucket element 54. As clearly indicated in Fig. 1, pair of pulley and cable assemblies 64, one on each side of bucket assembly 54, are provided for evenly adjusting its vertical position.

Inner bucket element 56 is similarly supported by means of pulley and cable assemblies 66 including cable 130, idler pulley 132, shaft 134 with take-up reel 136 and rotatably mounted within bearings 138 upon frame 118. A pair of hand-operated shaft-locking assemblies 140 and 142 are respectively operatively engaged with shafts 124 and 134 of assemblies 64 and 66 to permit them to be locked in any position.

The entire apparatus 10 shown in Figs. 1 and 2 is supported upon a rectangular frame assembly 144 fabricated, for example, of steel members. Supply tank 38 is supported above rectangular frame assembly 144 upon inwardly inclined members 146, for example, which extend upwardly within and above frame assembly 144 to the bottom of supply tank 38. The outer or inlet portion of troughs 12 are supported upon a ring-shaped angular section 148 which is mounted upon the top of rectangular frame 144 by means of intermediate structural forms 150 to which it is securely bolted. Channel member 18 is mounted upon diagonal braces 146 by means of suitably disposed angles and braces 152 and slotted brackets 154 which permit the vertical position of channel 18 to be adjusted and leveled.

In Figs. 2 and 10, the optimum position for outer splitter blade 14 relative to the lower or exit edge 156 of ring-shaped discharge surface 42 is shown. The upper edge 92 of splitter blade 14 is disposed below and within the exit 156 from surface 42 a distance sufficient to permit the horizontal component of the slurry velocity to substantially decrease which transforms the principal direction of flow of the effluent slurry to a substantially vertical direction. Particularly efficient dividing characteristics have been obtained when the principal direction of flow of the effluent slurry has become directed at an angle of 60° to the horizontal. This direction of flow is obtained, for example, when the slurry has fallen approximately 1½ inches within and down from the ring formed by the exit edge of troughs 12. The top edge 92 of splitter blade 14 is, for example, accordingly positioned 1½ inches down and within the ring formed by the exit edges of troughs 12. This causes the rest of blade 14 to lie substantially parallel to the principal direction of flow of the effluent slurry and, accordingly, to provide optimum splitting action without turbulence or tumbling ahead. At this removed point, it has also been found that rounded surface 42 has restrained the effluent stream into expanding in depth (that is within the vertical plane of the direction of flow) to a depth of, for example, two to three inches at the aforementioned splitter edge location from an initial depth of only ⅝ inch. This expansion in depth is enhanced by the lateral continuity of the surface 42 to permit the stratification within the effluent sream to remain relatively undisturbed in the expanded stream. This greatly facilitates division of the effluent stream in accordance with its stratification.

Positioning of the edge 92 of splitter 14 at a point where the principal direction of flow has become substantially vertical also permits a vertical adjustment in the position of the splitter blade 14 to provide a finer proportional change in the division of the effluent stream in accordance with its stratification. For example, a one inch vertical movement of blade 14 changes the proportion of solid matter in the concentrate by an amount as small as 5 to 8%, for example, whereas a greatly smaller movement of, for example, 1/16 inch of a close type splitter blade brought about the same proportional change. It is apparent, therefore, that the control of the blade to bring about a change in proportions in the concentrate is greatly enhanced by positioning the edge of the splitter blade a distance below the exit from the troughs.

Inner splitter blade 16 is positioned substantially parallel to outer splitter blade 14 to provide the same characteristics of division in dividing middlings and tailings from the effluent stream. The middlings are collected between blades 14 and 16, and the tailings are collected within the blade 16. The middlings may be reprocessed in another apparatus similar to apparatus 10 remotely disposed, for example, to abstract more valuable concentrate therefrom. Reprocessing of middlings may be repeated as long as it proves economically feasible. For this reprocessing, suitable conduits (not shown) are connected to the outlet chute 104. Other suitable conduits (not shown) are connected to discharge tubes 76 and discharge chute 110 to carry away the concentrate and tailings respectively to their ultimate destinations.

*Operation*

A supply of slurry is pumped into supply tank 38 through vertical supply pipe 52, or from above. This slurry which is suitably diluted with water flows through distributing tubes 36 into the pockets 34, each pair of which are simultaneously supplied by a pipe 36 which discharges substantially above the center of every other distributing baffle 32. The size of outlets 20 are selected to cooperate with the supply rate of slurry and with its flow characteristics to provide a head within channel 18 providing optimum stratifying characteristics within troughs 12. The size of the nozzles 20, for example, are chosen to cause the head within channels 18 to lie approximately at the tops of baffles 32. If the head should rise for any reason, it flows over the tops of the baffles into adjacent pockets to become evenly distributed within channel 18 without surging.

The slurry flows from nozzles 20 into divergent atmospheric pressure feeding segments 24. Divergent segments 24 feed the inlets to troughs 12 at tranquil laminar conditions of flow under atmospheric pressure conditions without sandbarring. It has been found advantageous to incline the bases 28 of segments 24 at an angle, for example, approximately equal to the angle of slope of the floors 44 of troughs 12.

As the slurry flows down troughs 12 under tranquil laminar conditions of flow without sandbarring, the slurry flowing therethrough becomes stratified in accordance with its constituent component. As the slurry discharges from the exits of troughs 12, it expands in depth within the vertical plane of flow to accentuate this stratification. Splitter blade 14 is disposed a sufficient distance below the exits of the troughs to permit the principal direction of flow of the effluent slurry to become vertical and parallel to the angular disposition of the side of blade 14. This provides effective separation of the concentrate from the effluent slurry without turbulence or tumbling over of the stream about the sharp edge 92 of blade 14. The position of edge 92 within the effluent stream may be finely adjusted by virtue of the fact that the direction of flow of the effluent stream at this point is substantially vertical which causes vertical movement of the splitter blade to result in relatively slight change of its position within the effluent stream.

Inner splitter blade 16 performs a similar function with respect to the upper or inner portion of the effluent slurry which contains the middlings and tailings.

All of the aforementioned features cooperate to provide a slurry concentrating apparatus, of the type described, which feeds the slurry to the separating troughs under optimum conditions of tranquil atmospheric type flow, which minimizes turbulence during the dividing of the effluent stream in accordance with the induced stratification, and which permits fine continuous adjustment of the splitter blades to their optimum dividing positions.

What is claimed is:

1. A structure for a slurry separating apparatus including a spoke-like array of convergent troughs which slope down and radially inward to a common outlet circle, said structure comprising means for supporting the outer inlet ends of said troughs in a substantially circular array, a relatively smaller diameter circular ring concentrically disposed a predetermined distance below said circular array of inlet ends for supporting the outlet ends of said troughs, a circular channel means disposed a predetermined distance above and within the inlet ends of said troughs, an outlet means for supplying each of said convergent troughs disposed in the base of said circular channel element substantially in line with the centers of each of said troughs, a divergent downwardly and outwardly sloping segment connecting each of said outlets with said inlets to said troughs, said segments diverging from said outlets to a width substantially equal to the width of the inlets to said troughs at a common rear wall shared therewith, the floors of said segments terminating a distance from said common rear ends sufficient to provide a space which permits said slurry to undergo a smooth reversal in radial direction of flow in passing from said segments to said troughs, divider means disposed within said circular channel between each of said outlets, the walls of dividers sloping towards said outlets to prevent sandbarring within the spaces formed by said dividers within said channel, a sharp-edged inverted conical splitter element disposed a short distance below and inside of the outlet ends of said troughs for dividing the slurry issuing from said troughs into separate streams in accordance with the stratification induced within said troughs, continuously adjustable means operatively associated with said circular splitter element for adjustably maintaining said element a predetermined distance below the outlet ends of said troughs, a feed means is centrally disposed above said channel, conduit means are connected to said tank for supplying said slurry thereto, distributing tubes slope radially outwardly and downwardly from said tank to said channel for conducting said slurry thereto, and one of said distributing tubes discharges substantially directly above the center of every other one of said divider means.

2. A structure as set forth in claim 1 wherein said relatively smaller diameter ring has a downwardly curved internal upper surface, and a continuing offset is provided within the top of said surface within which the inlet ends of each of said troughs rests to permit said downwardly curved surface to provide a smooth continuation of the floors of said troughs.

3. A structure as set forth in claim 2 wherein a retaining ring is mounted upon and above said relatively smaller diameter ring, and said retaining ring bears against the upper surfaces of the outlet ends of said troughs to maintain them in firm contact with said smaller diameter ring.

4. A structure as set forth in claim 1 wherein said continuously adjustable means are comprised of pulley and cable assemblies.

5. An atmospheric pressure slurry distributing means for a slurry separating apparatus including a spoke-like array of convergent troughs which slope down and radially inward to a common outlet circle, said distributing means comprising a circular channel means disposed a predetermined distance above and within the inlet ends of said troughs, an outlet means for supplying each of said convergent troughs disposed in the base of said circular channel element substantially in line with the center of each of said troughs, divider means disposed within said circular channel between said outlets, the walls of said dividers sloping towards said outlets to prevent sand-barring within the spaces formed by said dividers within said channel, a feed tank centrally disposed above said channel, conduit means connected to said tank for supplying said slurry thereto, and distributing tubes sloping radially outwardly and downwardly from said tank to said channel for conducting said slurry thereto, and one of said distributing tubes discharging substantially directly above every other one of said dividers.

6. A structure as set forth in claim 5 wherein said dividers in said channel elements are substantially triangular in cross section taken along the circumference of said channel.

7. A structure as set forth in claim 6 wherein the height of said dividers is substantially equal to the head of slurry in said circular channel which provides optimum flow conditions thereby maintaining said supply of slurry to each of said outlets substantially segregated until the slurry level rises above the tops of said dividers and then distributes any excess slurry smoothly to adjacent outlets.

8. A dividing means as set forth in claim 1 wherein said sharp-edged circular splitting element is comprised of a frustum of an inverted cone, the edge of said conical splitter element is disposed within the stream of slurry which discharges from said surface of said ring at a position wherein the principal component of flow is vertical, and the conical surface of said element is disposed at an angle substantially coincident with the direction of flow of said streams of slurry at the edge of said splitter element.

9. A dividing means as set forth in claim 8 wherein the conical surface of said element is disposed at an angle of approximately 60° to the horizontal.

10. A dividing means as set forth in claim 8 wherein the edge of said splitter element is disposed approximately 1½ inches within and 1½ inches below the exits of said convergent troughs.

11. A dividing means as set forth in claim 8 wherein said splitter element divides concentrate from the effluent stream, a second similarly formed splitter element is similarly disposed relative to said effluent stream of slurry, and said second splitter element is concentrically spaced within said concentrate splitter element a distance sufficient to cooperatively divide said stream into middlings and tailings.

12. A dividing means as set forth in claim 11 wherein the conical surface of said second splitter element is disposed at an angle of approximately 50° to the horizontal.

References Cited in the file of this patent

UNITED STATES PATENTS

| | | |
|---|---|---|
| 477,111 | Gates | June 14, 1892 |
| 898,331 | Darrow | Sept. 8, 1908 |
| 2,660,305 | Labouygues | Nov. 24, 1953 |
| 2,769,545 | Cannon | Nov. 6, 1956 |
| 2,780,356 | Hobart | Feb. 5, 1957 |